United States Patent [19]
Van Der Steen et al.

[11] Patent Number: 5,750,055
[45] Date of Patent: May 12, 1998

[54] PROCESS FOR THE PREPARATION OF INDUSTRIALLY APPLICABLE DIFUNCTIONAL ANIONIC POLYMERIZATION INITIATORS AND THEIR USE

[75] Inventors: Frederik Hendrik Van Der Steen; Judith Johanna Berendina Walhof, both of Amsterdam, Netherlands

[73] Assignee: Shell Oil Company, Houston, Tex.

[21] Appl. No.: 491,017

[22] Filed: Jun. 15, 1995

[30] Foreign Application Priority Data

Jul. 27, 1994 [EP] European Pat. Off. ............ 94201847

[51] Int. Cl.$^6$ ............................................ C07F 1/02
[52] U.S. Cl. ............................................ 260/665 R
[58] Field of Search ............................ 260/665 R

[56] References Cited

U.S. PATENT DOCUMENTS

| | | |
|---|---|---|
| 3,652,516 | 3/1972 | Farrar . |
| 3,663,634 | 5/1972 | Morton et al. . |
| 3,668,263 | 6/1972 | Morrison et al. . |
| 3,694,516 | 9/1972 | Morrison et al. . |
| 3,734,973 | 5/1973 | Farrar . |
| 3,903,168 | 9/1975 | Foss et al. . |
| 3,954,894 | 5/1976 | Kamienski et al. . |
| 4,039,593 | 8/1977 | Kamienski et al. . |
| 4,172,100 | 10/1979 | Tung et al. . |
| 4,182,818 | 1/1980 | Tung et al. . |
| 4,822,530 | 4/1989 | Bronstert et al. . |
| 4,960,842 | 10/1990 | Lo et al. . |
| 5,393,843 | 2/1995 | Handlin, Jr. et al. . |
| 5,405,911 | 4/1995 | Handlin, Jr. et al. . |
| 5,600,021 | 2/1997 | Schwindeman et al. ........ 260/665 R X |
| 5,621,149 | 4/1997 | Schwindeman et al. ........ 260/665 R X |
| 5,663,398 | 9/1997 | Schwindeman et al. ........ 260/665 R X |

FOREIGN PATENT DOCUMENTS

| | | |
|---|---|---|
| 185080 | 4/1982 | European Pat. Off. . |
| 0316857 | 11/1988 | European Pat. Off. . |
| 413294 A2 | 8/1990 | European Pat. Off. . |
| 0682041 | 11/1995 | European Pat. Off. . |
| 2313389 | 6/1975 | France . |

OTHER PUBLICATIONS

C. W. Kamienski, R. C. Morrison and T. L. Rathman, "Difunctional Lithium Polymerization Initiators".

R. P. Foss, H. W. Jacobson, H. N. Cripps, and W. H. Sharkey, "Block and Graft Copolymers of Pivalolactone. 4. Triblock and Block–Graft Copolymers from Pivalolactone and Isoprene", 1979, American Chemical Society.

P. Lutz, E. Franta and Paul Rempp, "An efficient bifunctional lithium–organic initiator to be used in apolar solvents", 1982, Polymer.

T. E. Long, A. D. Broske, D. J. Bradley and J. E. McGrath, Synthesis and Characterization of Poly (t–Butyl Methacrylate–b–isoprene–b–t–Butyl Methacrylate) Block Copolymers by Anionic Techniques, 1989, Journal of Polymer Science.

L. J. Fetters, C. W. Kamienski, R. C. Morrison, and R. N. Young, "Remarks on Organodilithium Initiators", 1979, American Chemical Society.

R. P. Foss, H.W. Jacobson, and W. H. Sharkey, "A New Difunctional Anionic Initiator".

*Primary Examiner*—Paul F. Shaver
*Attorney, Agent, or Firm*—Donald F. Haas

[57] ABSTRACT

A process for the preparation of an efficient industrial organolithium diinitiator, comprising the reaction of two equivalents of a mono-organolithium initiator with one equivalent of 1,3-diisopropenyl benzene at a temperature in the range of from −20° to 60° C., in an apolar hydrocarbon solvent, and in the presence of a monofunctional tertiary amine in a molar ratio relative to mono-organolithium initiator from 0.5 to 2, followed by addition to the reaction mixture of a small amount of conjugated diene monomer, at a temperature in the range of from 0° to 30° C., to form a solution of an α,ω-dilithio poly(conjugated diene), having an apparent molecular weight in the range of from 1000 to 3000.

10 Claims, No Drawings

PROCESS FOR THE PREPARATION OF INDUSTRIALLY APPLICABLE DIFUNCTIONAL ANIONIC POLYMERIZATION INITIATORS AND THEIR USE

FIELD OF THE INVENTION

The present invention relates to a process for the preparation of industrially applicable difunctional anionic polymerization initiators and their use for the manufacture of substantially symmetrical block copolymers derived from at least a conjugated diene and a monovinylaromatic monomer. More in particular the present invention relates to a process for the preparation of $\alpha,\omega$-dilithiopolydienes.

BACKGROUND OF THE INVENTION

Block copolymers of the type ABA or CABAC, wherein B represents a predominantly poly(conjugated diene)block, A represents a predominantly poly(monovinylaromatic) block and C represents a predominantly poly(polar vinyl monomer)block, have shown a growing interest, while on the other hand the requirements to be met by such block copolymers with reference to their specified standard properties have become more and more stringent.

The preparation of dilithium organo compounds for the anionic polymerization of monovinylaromatic and/or conjugated diene monomers into block copolymers was known in principle from e.g. U.S. Pat. Nos. 3,652,516; 3,734,973; 3,663,634; 3,694,516; 3,668,263; 3,903,168; 3,954,894; 4,039,593; 4,172,100; 4,182,818; 4,960,842; European patent applications Nos. 0316857 and 4132294 and from Macromolecules 5, 453-8 (1969); R. P. Foss et al, Macromolecules 12, 344-6 (1979); C. W. Kamienski et al, Curr. Appl. Sci. Med. Technol. 315-25 (1985); R. P. Foss et al, Macromolecules 10, 287-291 (1977); R. P. Foss et al, Macromolecules 12, 1210-1216 (1979); Polymer 23, 1953-9 (1982); T. E. Long et al, J. Polym. Sci. Part A, Polym. Chem. vol. 27, 4001-4012 (1989).

In particular from the U.S. Pat. No. 3,663,634 the preparation of hydrocarbon soluble organodilithium polymerization initiators was known. Said preparation comprised intimately contacting lithium metal with at least one compound selected from the group consisting of polyaryl substituted ethylenes, hydrocarbon substituted and unsubstituted conjugated diolefins and vinyl substituted aromatic compounds containing only carbon and hydrogen atoms, in a solvent mixture comprising (A) at least one solvent member selected from the group consisting of aliphatic, cycloaliphatic and aromatic hydrocarbons, and (B) at least one solvent member selected from a group of aromatic ethers, aromatic thioethers and tertiary amines, and wherein the volume fraction of solvent component (A) in the mixture can range from 57.0 vol % to 92.0 vol % and wherein the volume fraction of solvent component (B) in the solvent mixture can range from 8.0 to 43.0 vol %.

As component (B) preferably anisole was proposed and as the polyaryl-substituted ethylene 1,1-diphenylethylene was proposed.

The preferred amount of anisole in the solvent mixture was indicated to be about 15 vol % in combination with 85 vol % benzene.

From U.S. Pat. No. 3,694,516 was known a method for the preparation of a solvated lithium metal adduct of at least one member selected from the group consisting of (a) conjugated polyene hydrocarbon monomers and in particular 1,3-butadiene or isoprene, (b) vinyl substituted aromatic hydrocarbon monomers and in particular styrene, (c) mixtures of (a) and (b), and (d) their slightly chain-extended oligomers, which comprised providing a solution, in an organic solvent which includes at least one member selected from volatile liquid inert strongly solvating dialkyl ethers, cyclic ethers and tertiary amines, of at least one di- or poly-lithio adduct selected from the aforesaid (a), (b), (c) and (d) groups, admixing said solution with at least one member selected from the group consisting of weakly solvating liquid ethers (e.g. anisole) and weakly solvating liquid tertiary amines, said weakly solvating compounds having a boiling point substantially higher than the boiling point of said strongly solvating compound, and evaporating from said mixture substantially all of said strongly solvating compound without substantial evaporation of said weakly solvating compound. The preferred liquid hydrocarbon solvent was benzene.

In U.S. Pat. No. 4,196,154 multifunctional lithium containing initiators were lateron disclosed, which were soluble in hydrocarbon solvents and thus highly useful in the preparation of block copolymers aimed at.

Additional teachings regarding the use of multifunctional lithium based initiators could be found in e.g. U.S. Pat. Nos. 4,201,729; 4,200,718; 4,205,016; 4,172,190 and 4,196,153. However, the disadvantage connected with the use of multifunctional lithium containing initiators, providing polymers having rather wide molecular weight distributions (about 1.1 or greater), still remained.

Additional techniques were proposed, such as the use of coinitiators such as lithium alkoxides or specific triamines such as pentamethyldiethylene triamine or combinations thereof were proposed to obtain butadiene containing block copolymers having molecular weight distributions down to 1.06. Similar polymers containing primarily isoprene did not become available at all, because isoprene appeared to be less easily polymerizable by anionic techniques compared to butadiene and even rapid polymer addition did not occur.

It has been generally appreciated by persons skilled in the art, that block copolymers of improved tensile strength are obtained if the block copolymer has a reduced molecular weight distribution. In particular, a triblock polymer of the formula styrene/isoprene/ styrene prepared by conventional coupling of monofunctional lithium initiated diblock copolymers was found to demonstrate significantly improved tensile strength for equivalent number average molecular weight polymers, if the molecular weight distribution (Mw/Mn) is 1.03 instead of 1.20. L. C. Case, Makromol. Chem. V. 37, p 243 (1960).

Therefore there is still a need for block copolymers of monovinylaromatic monomer and conjugated diene, having the presently required physical properties and hence a related appropriate molecular weight distribution.

According to the disclosure of the European patent application No. 0316.857 it was tried to produce the block copolymers aimed at by means of a process, using a specific diinitiator organo-lithium compound and a specific organic diamine or triamine, optionally combined with a metal alkoxide having from 2 to 16 carbon atoms.

From the European patent application No. 0413.294 it was known to produce narrow molecular weight distribution block copolymers (Mw/Mn in the range from 1.027 to 1.058) of the formula B-B'-X-(B'-B) or A-B-B'-X-(-B'BA) wherein A was a block of a non elastomeric monomer, B is a block of isoprene, B' is a block of butadiene and X is the remnant of a hydrocarbon soluble difunctional lithium initiator, said block copolymer having a molecular weight distribution (Mw/Mn) of less than 1.06.

As specific difunctional lithium based initiator were mentioned 1,3- or 1,4-phenylene bis(3-methyl-1-phenylpentylidene) bislithium or 1,3- or 1,4-phenylene bis (3-methyl-1-(4-methyl)phenyl-pentyliydene) bislithium.

Moreover the polymerization was conducted in the presence of an aliphatic triamine and in particular N,N,N',N'',N''-pentamethyl diethylene triamine.

It will be appreciated that especially from both before mentioned European patent publications there was a teaching to a person skilled in the art to use multifuntional amines during the polymerization of the block copolymers aimed at.

Although the use of dilithio initiators for the preparation of symmetrical block copolymers having an appropriate narrow molecular weight distribution had been disclosed in principle for a long time, up to now no actual commercial polymerization process has been carried out with the use of said initiators, due to an inevitably occurring too high vinyl content in the poly(conjugated diene) blocks caused by the copresence of a polar compound such as amines or ethers.

It will be appreciated that symmetrical block copolymers aimed at, can in principle be manufactured by coupling of living initially prepared intermediate block copolymers with a multifunctional and in particular difunctional coupling agent.

However a disadvantage of such coupling process was formed by the presence in the final block copolymer of a usually difficultly controllable amount of diblock copolymer, formed from the intermediate living polymer.

Another alternative preparation route of such symmetrical block copolymers comprises the fully sequential polymerization by using a monofunctional organolithium initiator optionally in combination with a second initiation to provide a predetermined controlled amount of diblock copolymer.

However, a problem of said full sequential polymerization process is caused by a relatively broad molecular weight distribution of the block segment, due to a relatively difficult initiation of the last monomer charge and a difficult control of the molecular weight of the last block.

It will be appreciated that an industrial process for the preparation of symmetrical block copolymers, and in particular symmetrical triblock copolymers, which show an acceptable molecular weight distribution in combination with a relatively low vinyl content in the poly(conjugated diene) blocks due to 1,2 or 3,4 polymerization, which could meet the requirements of modern end uses of said block copolymers, by the use of a difunctional organolithium initiator, may provide significant advantages such as shorter polymerization times.

An object of the present invention was therefore to provide a suitable difunctional organolithium initiator. Additional objects of the present invention was to provide an attractive industrial process for the preparation of symmetrical block copolymers as specified hereinbefore and to provide a process for the preparation of such initiators.

As a result of extensive research and experimentation such a difunctional organolithium initiator aimed at was surprisingly found.

SUMMARY OF THE INVENTION

The present invention is a process for the preparation of an efficient industrial organolithium diinitiator, comprising the reaction of two equivalents of a mono-organolithium initiator with one equivalent of 1,3-diisopropenylbenzene at a temperature in the range of from −20° to 60° C. in an apolar hydrocarbon solvent, and in the presence of a mono- functional tertiary amine in a molar ratio relative to mono-organolithium initiator of from 0.5 to 2 and more preferably from 1.0 to 1.5, followed by addition to the reaction mixture of a small amount of conjugated diene monomer, at a temperature in the range of from 0° to 30° C., to form a solution of an α,ω-dilithio poly(conjugated diene), having an apparent molecular weight in the range of from 1000 to 3000.

DETAILED DESCRIPTION OF THE INVENTION

The present invention is a process for the preparation of an efficient industrial organolithium diinitiator, comprising the reaction of two equivalents of a mono-organolithium initiator with one equivalent 1,3-diisopropenylbenzene at a temperature in the range of from −20° to 60° C. in an apolar hydrocarbon solvent, and in the presence of a monofunctional tertiary amine in a molar ratio relative to mono-organolithium initiator of from 0.5 to 2 and more preferably from 1.0 to 1.5, followed by addition to the reaction mixture of a small amount of conjugated diene monomer, at a temperature in the range of from 0° to 30° C., to form a solution of an α,ω-dilithio poly(conjugated diene), having an apparent molecular weight in the range of from 1000 to 3000.

As mono-organolithium initiator is preferably used sec.butyllithium or tert.butyllithium, the former of which is most preferred.

The reaction temperature during the reaction of 1,3-diisopropenylbenzene with the monoorganolithium initiator is preferably in the range of from −10° to 50 _C. and more preferably in the range of from 0° to 30 _C.

The apolar hydrocarbon solvent was found to be preferably selected from cycloalkanes, having from 5 to 8 carbon atoms and more preferably having 5 or 6 carbon atoms.

Also mixtures of such cycloalkanes or mixtures of predominant amounts of such cycloalkanes and minor amounts of aliphatic hydrocarbons having from 5 to 8 carbon atoms can be used, but the use of substantially pure cyclohexane or substantially pure cyclopentane was found to be most preferred.

The conjugated diene monomer to be added in small amounts to the reaction medium can be selected from butadiene, isoprene, 2-ethyl-1,3-butadiene, 2,3-dimethyl-1,3-butadiene and 1,3-pentadiene or mixtures thereof.

As the conjugated diene is preferably used the same conjugated diene as those which constitute later on the poly(conjugated diene) block(s) in the final block copolymer.

The apparent molecular weight of the prepared α,ω-dilithio initiator is preferably in the range of from 1000 to 2800 and more preferably from 1200 to 2300.

Said apparent molecular weight is a number average molecular weight determined by gel permeation chromatography using polystyrene standard calibration polymers.

It was surprisingly found that stable, hydrocarbon solvent soluble α,ω-dilithio initiators could be obtained by addition of a small amount of a conjugated diene monomer and a specific amount of monofunctional tertiary amine relative to the amount of monolithium compound which appeared to influence the stereochemistry of the diene polymerization in an acceptable minimal degree during the subsequent use of the initiator for the preparation of the final block copolymer (vinyl content was found to be at most 10%).

Suitable examples of monofunctional amines to be used for the preparation of the diinitiator of present invention are trialkylamines, the alkyl groups in which containing from 1 to 5 carbon atoms and more preferably from 2 to 4 carbon atoms, triarylamines or tri(aralkyl)amines. Most preferably triethylamine is used.

It will be appreciated that another aspect of the present invention is formed by the reaction product solutions, comprising the stable α,ω-dilithio initiator obtained according to the hereinbefore specified process, dissolved in the hydrocarbon solvent as such or optionally diluted with the hereinbefore specified hydrocarbon solvent(s) to achieve the desired concentration of the α,ω-dilithio initiator prepared, to which have been optionally added one or more of the monomers to be incorporated into the finally desired block copolymers.

A further aspect of the present invention is formed by a process for the preparation of symmetrical block copolymers derived from monovinylaromatic monomers, conjugated dienes and optionally additional polar vinyl monomers having the required combination of narrow molecular weight distribution (Mw/Mn≦1.20) and relatively low vinyl content (≦10%) of the predominantly poly(conjugated diene) blocks, by anionic polymerization, using the hereinbefore specified α,ω-dilithio initiator solution.

More in particular a process is provided for the preparation of linear block copolymers constituted by monovinylaromatic monomer, conjugated diene and optionally a polar vinyl monomer of the structure ABA, ABCBA, CBC, ACBCA or CABAC respectively, wherein A represents a predominantly poly(monovinylaromatic) block, B represents a predominantly poly(conjugated diene) block and C represents a predominantly poly(polar vinyl) block.

Accordingly the present invention is also relating to a process, comprising:

(1) charging a predominantly conjugated diene monomer as specified hereinbefore to an α,ω-dilithio initiator in a hereinbefore specified hydrocarbon solvent and allowing essentially complete polymerization to occur; thereafter (2) optional addition of an ether to promote the cross-over and charging a predominantly monovinylaromatic monomer or a predominantly polar vinyl monomer after introduction of an end-capping agent and addition of ether and allowing essentially complete polymerization to occur; and optionally (3) introduction of a reagent for introduction of an end-capping of the living polymers and introduction of an ether and charging a predominantly polar vinyl monomer, and allowing essentially complete polymerization.

With the terms "predominantly conjugated diene", "predominantly conjugated diene" and "predominantly polar vinyl compound" as used throughout this specification, is meant that the indicated monomer may be substantially pure or mixed in a minor degree with a structurally related monomer or with a structurally different monomer and preferably the same comonomer, which occurs in other block segments, i.e. in amounts of less than 15 mol % of the total monomers of said blocks and preferably less than 5 mol %.

Suitable examples of monomer mixtures constituting the blocks A are mixtures of styrene and minor amounts of monomers selected from the group consisting of alpha-methylstyrene, p-vinyltoluene, m-vinyl toluene, o-vinyltoluene, 4-ethylstyrene, 3-ethylstyrene, 2-ethylstyrene, 4-tert.butylstyrene, 2,4-dimethylstyrene, 2 or 4-vinylpyridine butadiene, isoprene, 2-ethyl-1,3-butadiene, 2,3-dimethyl-1,3-butadiene and 1,3-pentadiene or mixtures thereof.

Suitable examples of monomer mixtures constituting block B are mixtures of isoprene or butadiene and minor amounts of monomers selected from styrene, alpha-methylstyrene, p-vinyltoluene, m-vinyltoluene, o-vinyltoluene, 4-ethylstyrene, 3-ethylstyrene, 2-ethylstyrene, 4-tert.butylstyrene, 2,4-dimethylstyrene, butadiene or isoprene, 2-ethyl-1,3-butadiene, 2,3-dimethyl-1,3-butadiene and 1,3-pentadiene or mixtures thereof.

Preferably the constituting monomers of blocks A are mixtures of styrene in a major amount and structurally related monomers as specified hereinbefore in a minor amount and preferably alpha-methylstyrene, while the constituting monomers of block B are selected from butadiene, isoprene and mixtures thereof.

Suitable examples of monomer mixtures constituting optional blocks C are mixtures of a major component selected from lower alkyl ($C_1$–$C_4$) esters of acrylic acid or methacrylic acid such as tert.butylacrylate, tert.butylmethacrylate, methylacrylate, methylmethacrylate, or esters or anhydrides of maleic acid, fumaric acid, itaconic acid, cis-4-cyclohexene-1,2-dicarboxylic acid, endo-cis-bicyclo(2,2,1)-5-heptene-2,3-dicarboxylic acid or mixtures thereof, 2- or 4-vinylpyridine and as a minor component a comonomer selected from styrene, alpha-methylstyrene, p-vinyltoluene, m-vinyltoluene, o-vinyltoluene, 4-ethylstyrene, 3-ethylstyrene, 2-ethylstyrene, 4-tert.butylstyrene, 2,4-dimethylstyrene, butadiene or isoprene, 2-ethyl-1,3-butadiene, 2,3-dimethyl-1,3-butadiene and 1,3-pentadiene or mixtures thereof.

Most preferably the blocks A, B and C are constituted by one substantially pure monomer.

Suitable examples of cross-over ethers are THF, dioxo, diethoxypropane, glyme, diglyme and the like. Diethoxypropane is the most preferred.

It will be appreciated that according to a preferred process embodiment, the main solvent used for initial preparation of α,ω-dilithio initiator and the main solvent used during the actual block copolymer polymerization is the same, although it is not strictly necessary.

Suitable examples of ethers to be used as cosolvent for the polymerization of the polar vinyl monomers are diethylether, THF, tert-butylmethylether, diisopropylether and the like.

A further aspect of the present invention is formed by the block copolymers, obtained by the hereinbefore specified process and characterized by the combination of a narrow molecular weight distribution (Mw/Mn≦1.20) and a relatively low vinyl content of the predominantly poly (conjugated diene)blocks (≦10%).

Preferred block copolymers according to the present invention are linear triblock or five block copolymers derived from styrene, butadiene or isoprene and/or a lower alkyl ester of acrylic acid or methacrylic acid, or 2- or 4-vinylpyridine respectively as pure block constituents.

The invention is illustrated by the following examples, however, without any restriction of the scope of it to these specific embodiments.

EXAMPLE 1

Reaction of BuLi With 1,3-Diisopropenyl Benzene

Procedure A

To a stirred vessel, containing 80 ml of dry cyclohexane 0.65 g (6.4 mmoles) of triethylamine were added. Subsequently, 6.3 mmoles of s-BuLi (3.6 g of a 12 wt % solution in hexanes) and 0.48 g (3 mmoles) of 1,3-diisopropenylbenzene were added at room temperature. The reaction was continued for 35 minutes at room temperature, leading to a dark red solution.

Procedure B

To a stirred vessel, containing 200 ml of dry cyclohexane, 0.61 g (6 mmoles) of triethylamine were added. Subsequently, 6 mmoles of t-BuLi (5 ml of a 1.2 Molar solution in hexanes) and 0.48 g (3 mmoles) of 1,3-diisopropenylbenzene were added at 0° C. The reaction was continued for 1 hour.

EXAMPLE 2

Preparation of α,ω-Dilithiopolybutadiene

Procedure A

To the solution obtained by procedure A of Example 1 4.6 g of butadiene were added at 0° C. The dark red color rapidly changes to a light orange and becomes pale yellow after stirring overnight at room temperature. This solution was used as stock for polymerization experiments with a concentration of α,ω-dilithiopolybutadiene (MW=1350) of 0.025 Molar.

Procedure B

To the solution obtained by procedure B of Example 1 5.8 g of butadiene were added at 0° C. The dark red color rapidly changes to a light orange and becomes pale yellow after stirring overnight. This solution was used as stock for polymerization experiments with a concentration of α,ω-dilithiopolybutadiene (MW=2100) of 0.015 Molar.

EXAMPLE 3

Synthesis of SBS Block Copolymers With α,ω-Dilithiopolybutadiene A Using Diethoxypropane as Promotor For the Cross-Over to Styrene Polymerization To a polymerization bottle, charged with 250 ml of dry cyclohexane, a few drops of α,ω-dilithiopolybutadiene A were added to titrate the solution. Thereafter the reactor was charged with 11.2 g of butadiene and 6 ml of solution A (containing 0.15 mmol diinitiator) at room temperature. Polymerization was carried out for 2 hours at 60° C. A sample was withdrawn for analysis. The polybutadiene has the following characteristics: MW 78000 g/mol, Mw/Mn=1.18 and a vinyl content of 9.2%. To the bottle reactor were then added 25 μL (100 ppm) of diethoxypropane and 5.4 g of styrene and polymerization was continued for 30 minutes at 60° C. To the solution 1 ml of ethanol was added to terminate the polymerization. The recovered triblock copolymer was stabilized with antioxidant and had the following characteristics: MW 97000 g/mol, Mw/Mn=1.19. A sample was subjected to ozonolysis to leave PS with MW 20000 g/mol.

EXAMPLES 4–5

Following the procedure of Example 3, two other SBS triblock copolymers were prepared with the characteristics as shown in Table I.

| Sample | MW PB | MW PS* | $M_w/M_n$ | vinyl % | MW PS (ozon) |
|--------|-------|--------|-----------|---------|--------------|
| 4 | 84000 | 15000 | 1.19 | 9.2 | 16000 |
| 5 | 81000 | 21000 | 1.21 | 9.2 | 21500 |

*Calculated from GPC and $^1$H NMR, assuming a triblock structure.

EXAMPLE 6

Synthesis of SIS Block Copolymers With α,ω-Dilithiopolybutadiene A Using Diethoxypropane as Promotor For the Cross-Over to Styrene Polymerization To a polymerization bottle, charged with 250 ml of dry cyclohexane a few drops of α,ω-dilithiopolybutadiene A were added to titrate the solution. Thereafter the reactor was charged with 14.7 g of polyisoprene and 6 ml of solution A (containing 0.15 mmol diinitiator) at room temperature. Polymerization was carried out for 90 minutes at 60° C. A sample was withdrawn for analysis. The polyisoprene has the following characteristics: MW 114000 g/mol, Mw/Mn=1.17 with a 3,4 content of 4.6%. To the bottle were then added 25 μL (100 ppm) of diethoxypropane and 3.4 g of styrene and polymerization was continued for 30 minutes at 60° C. To the solution was added 1 ml of ethanol to terminate the polymerization. The recovered triblock copolymer was stabilized with antioxidant and had the following characteristics: MW 133000 g/mol, Mw/Mn=1.25. A sample was subjected to ozonolysis to leave PS with MW 12000 g/mol.

EXAMPLE 7

Synthesis of SBS Block Copolymer With α,ω-Dilithiopolybutadiene B With THF as Promotor For the Cross-Over to Styrene Polymerization To a reactor, charged with 1 1 of dry cyclohexane, were added a few drops of α,ω-dilithiopolybutadiene B to titrate the solution. Thereafter the reactor was charged with 30 g of butadiene and 40 ml of solution B (containing 0.6 mmol diinitiator) at room temperature. The temperature was allowed to rise to 40° C and polymerization continued for 10 hours at 40° C. A sample was withdrawn for analysis. The polybutadiene has the following characteristics: MW 51000 g/mol, Mw/Mn=1.06 and a vinyl content of 15%. To the reactor were then added 50 μL of dry THF and 20 g of styrene and polymerization was continued for 2 hours at 40° C. To the solution was added 1 ml of methanol to terminate the polymerization. The recovered triblock copolymer was stabilized with antioxidant and had the following characteristics: MW 89000 g/mol, Mw/Mn=1.07.

A solvent-casted had a Tensile Strength of 30.5 MPA and an Elongation at break of 1500%.

EXAMPLE 8

Synthesis of SBS Block Copolymers With α,ω-Dilithiopolybutadiene A Without Promotor for the Cross-Over to Styrene Polymerization To a polymerization bottle, charged with 250 ml of dry cyclohexane, a few drops of α,ω-dilithiopolybutadiene A were added to titrate the solution. Thereafter the reactor was charged with 8.6 g of butadiene and 6.8 ml of solution A (containing 0.17 mmol diinitiator) at room temperature. Polymerization was carried out for 2 hours at 60° C. A sample was withdrawn for analysis. The polybutadiene has the following characteristics: MW 52000 g/mol, Mw/Mn=1.24 and a vinyl content of 8.5%. To the bottle reactor were then added 5.5 g of styrene and polymerization was continued for 45 minutes at 60° C. To the solution was added 1 ml of ethanol to terminate the polymerization. The recovered triblock copolymer was stabilized with antioxidant and had the following characteristics: MW 90000 g/mol, Mw/Mn=1.19. A sample was subjected to ozonolysis to leave PS with MW 21500 g/mol.

COMPARATIVE EXAMPLES

EXAMPLES 9–12

Inefficiency of the s-BuLi/1,3-DIB Adduct

The adduct of s-BuLi and 1,3-diisopropenylbenzene was prepared following the procedure A of Example 1. With the resulting solution, several polymerizations have been carried out as shown in Table II.

| Sample | MW PB | MW PS* | $M_w/M_n$ | Tensile (MPA) | Elong (%) | PS(ozo) |
|---|---|---|---|---|---|---|
| 9 | 10000 | 18000 | 1.30 | too weak | — | 40000 |
| 10 | 20000 | 18000 | 1.30 | too weak | — | 45000 |
| 11 | 55000 | 25000 | 1.25 | too weak | — | 45000 |
| 12 | 70000 | 13000 | 1.20 | 0.6 | 200 | 30000 |

*Calculated from GPC and $^1$H NMR, assuming a triblock structure.

We claim:

1. A process for the preparation of an efficient industrial organolithium diinitiator, comprising the reaction of two equivalents of a mono-organolithium initiator with one equivalent of 1,3-diisopropenyl benzene at a temperature in the range of from −20° to 60° C., in an apolar hydrocarbon solvent, and in the presence of a monofunctional tertiary amine in a molar ratio relative to mono-organolithium initiator from 0.5 to 2, followed by addition to the reaction mixture of a small amount of conjugated diene monomer, at a temperature in the range of from 0° to 30° C., to form a solution of an α,ω-dilithio poly(conjugated diene), having an apparent molecular weight in the range of from 1000 to 3000.

2. The process according to claim 1, wherein the monofunctional tertiary amine is used in molar ratio relative to mono-organolithium initiator from 1.0 to 1.5.

3. The process according to claim 1, wherein the tertiary amine is a monofunctional amine trialkylamines, the alkyl groups of the amine containing from 2 to 4 carbon atoms.

4. The process according to claim 3, wherein the amine is triethylamine.

5. The process according to claim 1, wherein the mono-organolithium initiator is sec-butyllithium or tert-butyllithium.

6. The process according to claim 5, wherein the initiator is sec-butyllithium.

7. The process according to claim 1, wherein the reaction temperature during the reaction of 1,3-diisopropenylbenzene with the mono-organolithium initiator is in the range of from −10° to 50° C.

8. The process according to claim 7, wherein the reaction temperature during the reaction of 1,3-diisopropenylbenzene with the mono-organolithium initiator is in the range of from 0° to 30° C.

9. The process according to claim 1, wherein the apolar hydrocarbon solvent is selected from cycloalkanes having from 5 to 8 carbon atoms.

10. The process according to claim 9, wherein the apolar solvent is substantially pure cyclohexane or substantially pure cyclopentane is used.

* * * * *